United States Patent [19]

King

[11] 4,204,898
[45] May 27, 1980

[54] TAPE WINDING AND SPLICING MACHINE

[75] Inventor: James L. King, Southboro, Mass.

[73] Assignee: King Instrument Corporation, Westboro, Mass.

[21] Appl. No.: 917,638

[22] Filed: Jun. 21, 1978

[51] Int. Cl.² ............................................. B65H 19/20
[52] U.S. Cl. .................................. 156/159; 156/184; 156/502; 156/505
[58] Field of Search ............... 156/502, 505, 506, 184, 156/159; 83/558, 615, 563, 534

[56] References Cited

U.S. PATENT DOCUMENTS

| | | | |
|---|---|---|---|
| 2,778,420 | 1/1957 | Simon | 156/505 UX |
| 3,245,861 | 4/1966 | Roshkind | 156/505 X |
| 3,537,940 | 11/1970 | Nagano | 156/502 X |
| 3,785,235 | 1/1974 | Peddinghaus | 83/558 X |
| 3,870,584 | 3/1975 | Jores et al. | 156/505 |
| 3,997,123 | 12/1976 | King | 156/502 X |

Primary Examiner—David A. Simmons
Attorney, Agent, or Firm—Schiller & Pandiscio

[57] ABSTRACT

A novel type of splice trimmer is disclosed for use in a tape winding machine of the type designed to (1) splice magnetic tape into a leader tape connected between two hubs, and (2) take up the added tape on one of the two hubs.

The present invention comprises a pneumatically-operated cutting mechanism designed to impart a double concave "Gibson Girl" cut to the spliced tape at the splicing junction so as to substantially eliminate any tape overhang created by misalignment of the tape and leader during the splicing phase of the tape winding operation.

9 Claims, 7 Drawing Figures

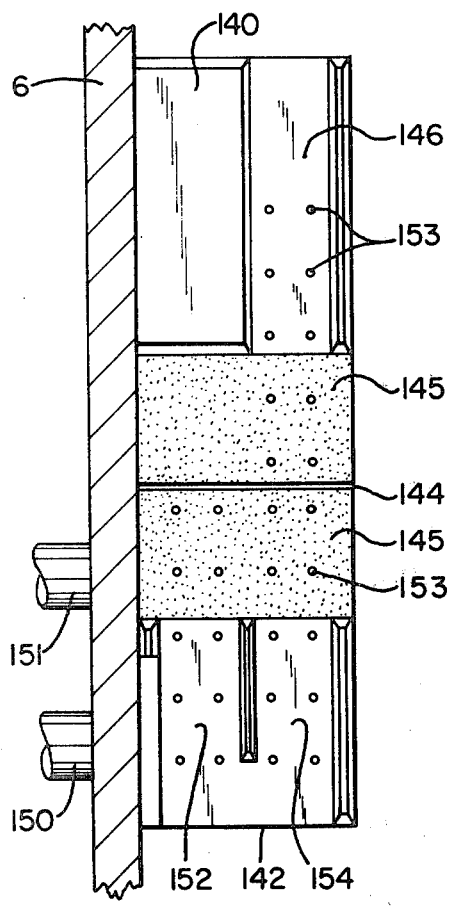
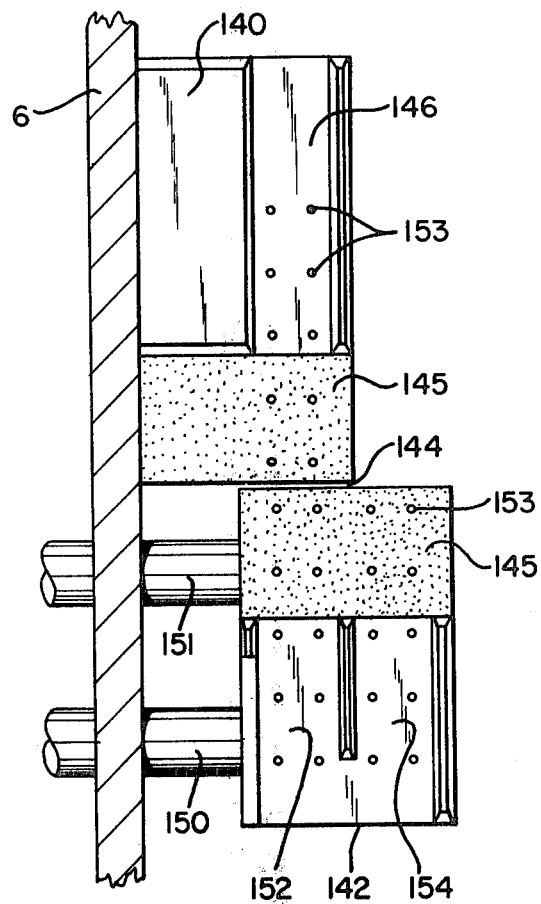
FIG. 3     FIG. 4
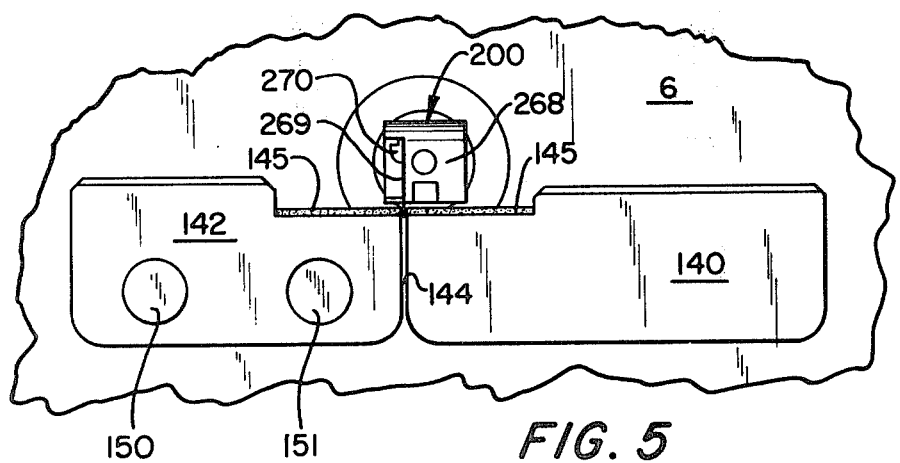
FIG. 5

TAPE WINDING AND SPLICING MACHINE

BACKGROUND OF THE INVENTION

This invention relates to tape winding machines in general and more particularly to a novel type of apparatus for trimming the splices created during a tape winding operation.

Machines used to transfer magnetic recording tape used in video or audio applications from the large supply reels prepared during manufacture and winding the same on hubs commonly employed in tape cassettes and cartridges, are well known in the art. See, for example, U.S. Pat. Nos. 4,061,286, 3,753,834, 3,637,153 and 3,997,123. The typical procedure is to start with first and second hubs connected by a leader tape, sever the leader tape and splice virgin or prerecorded magnetic tape to the leader tape attached to the first hub, wind a given amount of magnetic tape onto that hub, splice the trailing end of the magnetic tape to the leader on the second hub and then mount the two hubs in a cassette housing. Alternatively, the winding procedure may be conducted while the hubs are already mounted in the cassette.

Cassettes produced in this manner have proven quite satisfactory for most audio applications. Some difficulty may be encountered in video applications, however. This is due to the fact that when the virgin tape is spliced to the leader tape, absolutely perfect alignment between the two tapes may not always be achieved, with the result that some tape overhang at the side edges may occur at the splicing junction. This tape overhang, which prevents the spliced tape from having two uniform side edges, can create problems during video recording and playback. This problem may be sufficiently serious in the sophisticated equipment necessary for video reproduction and playback as to require costly and time-consuming manual trimming to be performed on the video tape splices to insure that substantially all tape overhang is eliminated.

Subsequently, one of the objects of the present invention is to provide an apparatus which will substantially eliminate any tape overhang created by a tape winding machine of the type described above.

Another object is to provide an apparatus which is adaptable for use with a tape winding machine of the type described above.

Yet another object of this invention is to provide a means for automatically trimming tape overhang at splicing junctions without manual assistance and without detracting from the normal operation of a tape winding machine.

SUMMARY OF THE INVENTION

These and other objects of the present invention are addressed by providing a remotely controlled splice trimmer apparatus which is specifically designed for use in a tape winding machine of the type described above and which will impart a concave cut at each edge of a splice so as to effectively eliminate any tape overhang.

BRIEF DESCRIPTION OF THE DRAWINGS

These and other objects of the present invention will be more fully disclosed or rendered obvious in the following detailed description of the invention, which is to be considered together with the accompanying drawings wherein:

FIGS. 3 and 4 are enlarged plan views showing a splicing block assembly in inner (FIG. 3) and outer (FIG. 4) positions;

FIG. 5 is an enlarged side view in elevation of the same splicing block and related apparatus;

DESCRIPTION OF THE PREFERRED EMBODIMENT

Figure 1:
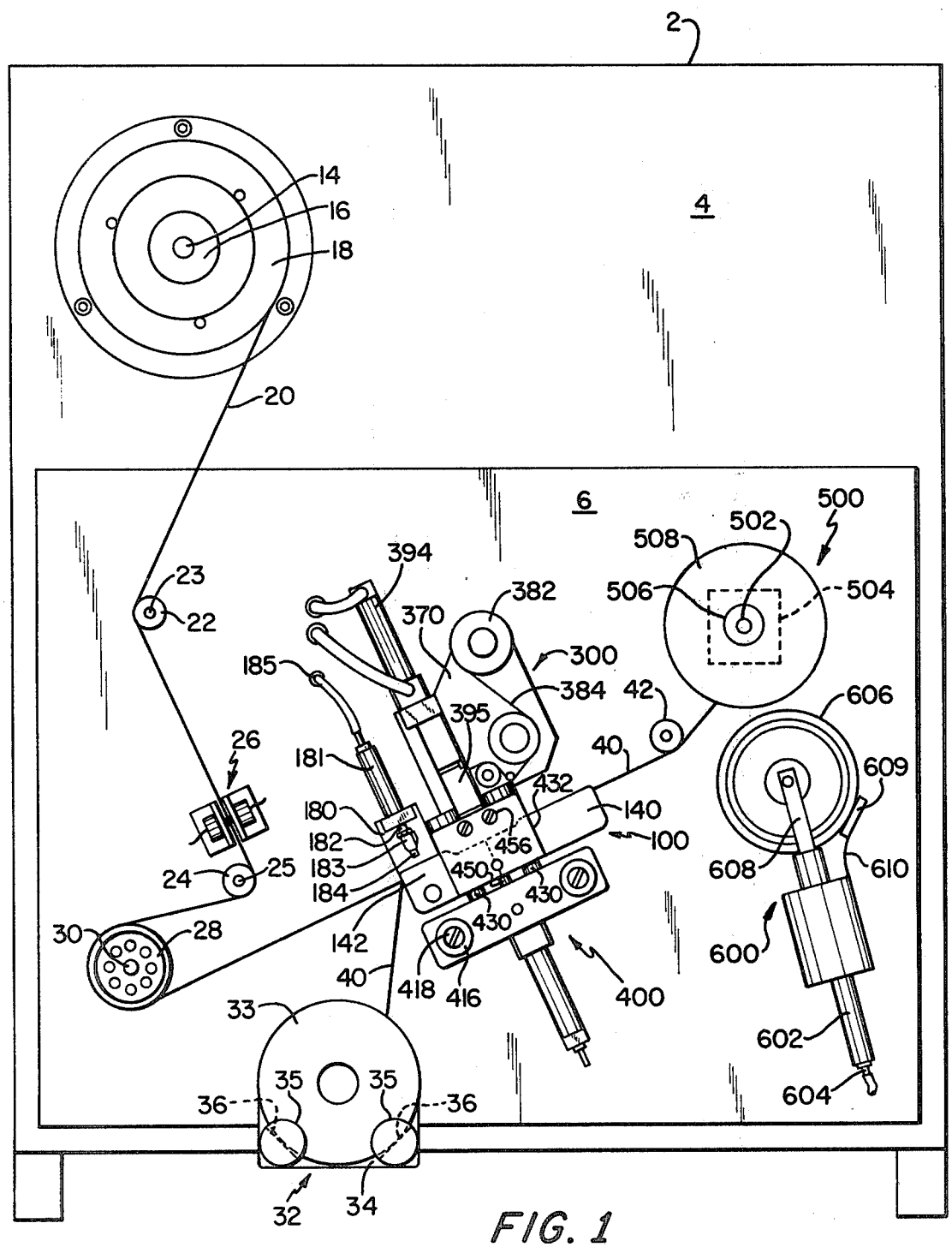
FIG. 1 is a front view of a tape winding machine employing the preferred form of the splice trimmer.

Looking first to FIG. 1, a tape winding machine is shown with a new splice trimmer assembly which comprises the preferred form of the present invention. The tape winding machine generally comprises a housing 2 having a front panel 4 with a large opening that is closed off by a plate or panel 6. Plate 6 serves as a support for a number of means including a splicing block assembly 100, a knife mechanism 200 (see FIG. 2), a splicing tape dispenser applicator 300, the splice trimmer assembly 400, a tape take-up assembly 500 and a tape packing assembly 600.

The splicing block assembly 100, knife mechanism 200, and splicing tape dispenser applicator 300 are substantially the same as the corresponding mechanisms disclosed in U.S. Pat. Nos. 4,061,286 and 3,753,835, except that the splicing block assembly has been modified to facilitate operation of the splice trimming assembly. Accordingly the splicing block assembly, knife mechanism and splicing tape dispenser applicator are described hereinafter only to the extent believed necessary to understand and appreciate the present invention.

Extending through the front panel 4 is a rotatable supply reel shaft 14 to which is affixed a hub assembly 16 for supporting a reel 18 containing a supply of magnetic tape 20. A pair of idler wheels 22 and 24 are mounted to plate 6 via rotatable shafts 23 and 25 respectively, and serve to direct tape 20 in a straight line through a tape detector 26 before engaging a counter wheel 28, which is mounted on a rotatable shaft 30. Also mounted to front panel 6 is a holder 32 for supporting a tape spool or hub 33. Holder 32 comprises a plate 34 which is affixed to panel 6 and a pair of rods 35 which are formed integral with and project from plate 34. Rods 35 are slotted intermediate their ends so as to form oppositely inclined surfaces 36 on which spool 33 rests.

Looking next in greater detail at the splicing block assembly (see FIGS. 1, 2, 3, 4, 5 and 6), the assembly 100 comprises a stationary splicing block 140 affixed to panel 6 and a movable splicing block 142. A small gap 144 separates the two blocks. Stationary block 140 has a flat upper surface in which is formed a single groove 146. Grove 146 serves as a tape guideway and is provided with a plurality of small apertures 153 which are connected via an interior passageway in block 140 to a hose fitting 149 which is carried by block 140 and projects through the rear of plate 6. Fitting 149 is connected through a hose and a valve member (not shown) to a suitable vacuum source (also not shown) so that a suction can be established through apertures 153 which will hold a tape flat against the bottom surface of groove 146.

Movable splicing block 142 is mounted on two parallel slide rods 150 and 151 which are slidably disposed in bushings in plate 6. Block 142 has a flat upper surface in which is formed two parallel grooves 152 and 154. Grooves 152 and 154 are identical to groove 146 in cross-sectional shape and extend parallel thereto, and are provided with a series of small apertures 153 in their bases to provide suction against tapes positioned in the two grooves. Interior passageways 155 connect apertures 153 with longitudinally extending bores 157 in the slide rods. Two hose fittings 156 (only one of which is shown) are used to connect the bores 157 with a vacuum source and control valve means (not shown) so that suction may be selectively applied to hold tapes tight in grooves 152 and 154. The top surfaces of blocks 140 and 142 are recessed somewhat in the area adjacent to gap 144 so as to accommodate a pair of Teflon ® pads 145. The upper surfaces of pads 145 sit flush with the bottoms of grooves 146, 152 and 154 and are preferably secured by means of a suitable adhesive, though other holding means may be substituted. Apertures 153 extend through pads 145 and serve to hold tapes against the pads.

Splicing block 142 may be moved perpendicularly to plate 6 so as to selectively align either of the grooves 152 and 154 with the groove 146. This may be seen in FIGS. 3 and 4. The movable splicing block is operated by means of a cross-block 158 attached to the rear ends of parallel slide rods 150 and 151 and is adapted to be reciprocated by a double-acting fluid actuator 160 which is secured to a block 162 affixed to the rear side of plate 6 and has its piston rod 163 attached to cross-block 158. By alternately applying pressure to one end or the other of actuator 160 via one or the other of hose fittings 161, grooves 152 and 154 can alternately be aligned with groove 146. Splicing block assembly 100 is defined to be in its inner position when groove 152 is aligned with groove 146 (FIG. 3), and in its outer position when groove 154 is aligned with groove 146 (FIGS. 2 and 4).

Mounted to movable splicing block 142 is a support block 180. It is attached to the top surface of block 142 behind groove 154 (as viewed in FIG. 1) and extends vertically upward from block 142. Block 180 supports a single-acting pneumatic actuator 181 which has attached to the end of its piston rod 182 a head 183 with a pad 184. Piston rod 182 is aligned with tape groove 154 and pad 184 has a width slightly less than that of groove 154, whereby the pad may be received by the groove. Piston rod 182 is normally in the retracted position of FIG. 1. However, when actuator 181 is properly stimulated by air supplied via fitting 185, piston rod 182 is advanced far enough downward for pad 184 to engage and hold down a tape located in groove 154.

Figure 2:
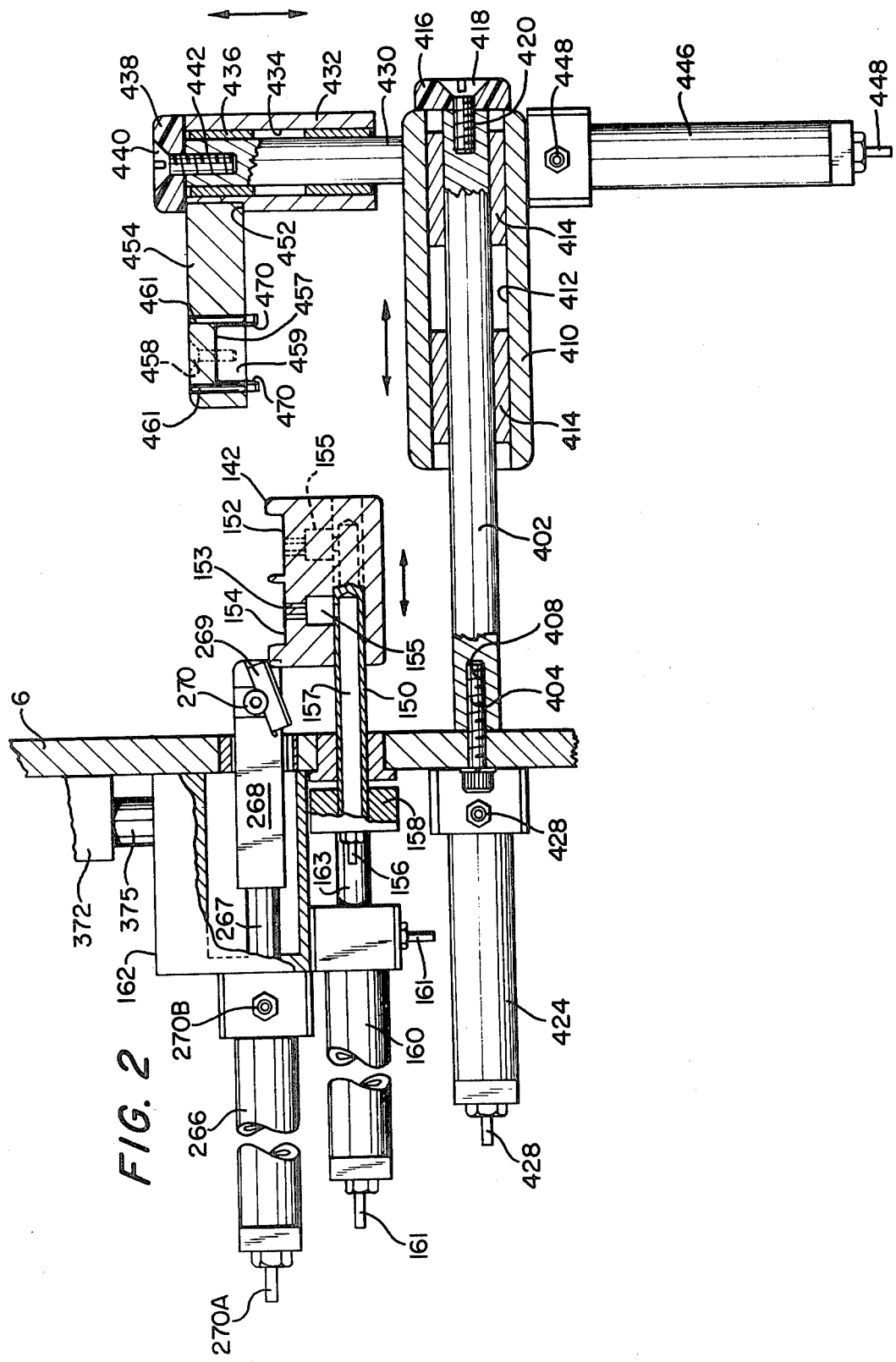
FIG. 2 is an enlarged cross-section of the same splice trimmer and related apparatus.
Figure 6:
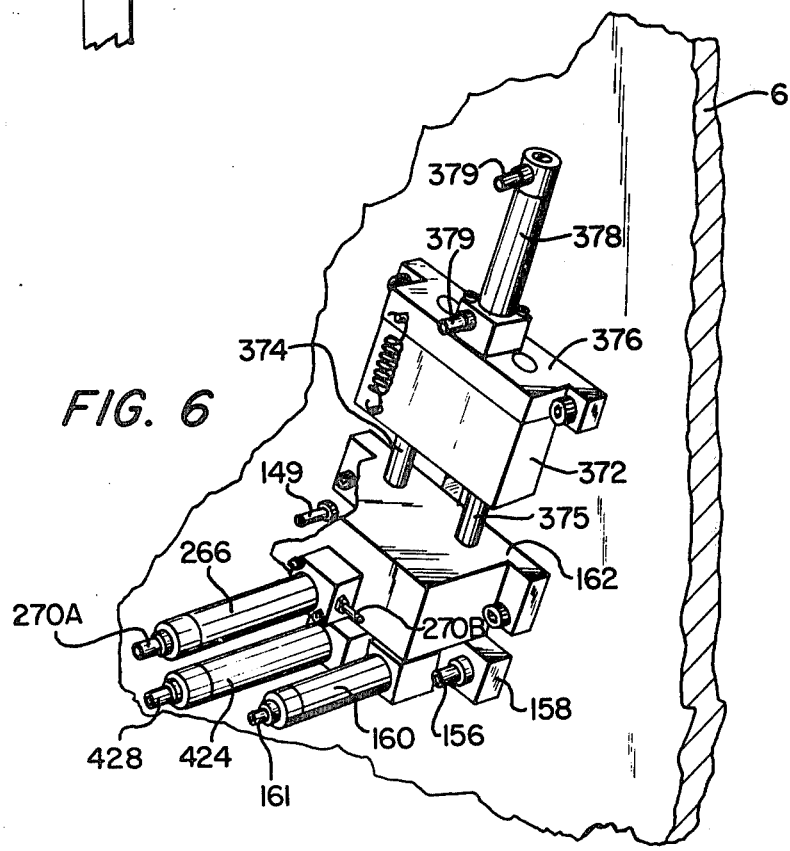
FIG. 6 is a perspective view of some of the operating means on the rear side of the front panel shown in FIG. 1.

Referring now to FIGS. 2, 5 and 6, knife mechanism 200 comprises a double-acting pneumatic actuator 266 mounted to block 162. Actuator 266 has a piston rod 267 which extends through a bore in block 162 and carries a cutter blade support arm 268. Arm 268 is aligned with an opening in plate 6 and mounts a cutter blade 269 on its forward end. Blade 269 is secured in place by means of screw arrangement 270. Blade 269 is positioned in line with the small gap 144 between splicing blocks 140 and 142, with the cutting edge down. In the rest position, actuator 266 is retracted by air introduced via fitting 270B so that arm 268 and block 269 will not interfere with tape moving along groove 146. When cutting is to be effected, actuator 266 is activated via hose coupling 270A so as to extend its position rod and thereby cause blade 269 to sever any tape extending from splicing block 140 to splicing block 142.

The splicing tape dispenser applicator 300 is constructed to apply a piece of adhesive-backed splicing tape to the adjacent ends of two tapes supported on the two splicing blocks. As shown in FIGS. 1, 2 and 6, applicator 12 comprises a carriage plate 370 that is attached to an arm (not shown) that extends through a slot in plate 6 and forms part of a slide block 372. Block 372 is slidably mounted on a pair of slide rods 374 and 375 whose ends are secured in block 162 and a second block 376, also attached to plate 6. Second block 276 provides support for a double-acting pneumatic actuator 378 whose piston rod (not shown) extends through a hole in block 376 and is secured to slide block 372. By suitably stimulating actuator 378 with an application of air via hose fittings 379, slide block 376 can be made to reciprocate along rods 374 and 375 so as to cause plate 370 to move in the same manner. In its at-rest position, block 372 is elevated as shown in FIG. 6.

Carriage plate 370 is constructed to rotatably support a supply roll 382 of splicing tape 384 and carries means for causing a predetermined amount of splicing tape to be pulled off supply roll 382 when carriage plate 370 is directed upward, and means comprising an actuator 394 for activating a plunger 395 which is adapted to sever a section of splicing tape 384 and apply the severed section of splicing tape to the abutting ends of two tapes on splicing blocks 140 and 142 when plate 370 is moved in the downward direction. The severed piece of splicing tape is held against the bottom face of plunger 395 by suction provided by suitable means (not shown) transmitted through suitable apertures (not shown) in the bottom surface of the plunger.

Also mounted to front panel 6 is the new splice trimmer assembly 400, which embodies the preferred form of the invention. As shown in FIGS. 1, 2, 6 and 7, a pair of support rods 402 extend perpendicularly outward from panel 6. Bolts 404 are inserted through panel 6 through suitable holes and are screwed into tapped blind holes 408 formed in the inward ends of rods 402, thereby affixing support rods 402 to panel 6.

Slidably disposed on support rods 402 is a support block 410. For this purpose block 410 is provided with a pair of bores 412, and a pair of cylindrical bushings 414 are set within each bore so as to enable block 410 to slide freely on support rods 402. The outer ends of the support rods are fitted with plastic caps 416 which serve as stops for the support block 410. Each cap 416 is preferably attached by a screw 418 set in a tapped blind hole 420 formed in the outer end of each rod 402, though other suitable means may be used. Support rods 402 are positioned such that the top surface of support block 410 is parallel to the top surfaces of splicing blocks 140 and 142.

Attached to the rear side of panel 6 is a double-acting pneumatic actuator 424. Actuator 424 has a piston rod 426 (FIG. 7) which extends through an oversized hole in panel 6 and is coupled to support block 410. Piston rod 426 is disposed between support rods 402 and is preferably threaded on its exterior end so as to engage a tapped blind hole (not shown) formed in block 410. The normal position of actuator 424 is with its piston rod extended. The hose fittings 428 of actuator 424 are connected by a suitable four-way valve (not shown) to a source of pressurized air. By alternately applying the pressurized air to one or the other of its hose fittings 428, actuator 424 can be activated to move piston rod 426 perpendicularly to panel 6 and thereby move support block 410 along support rods 402.

Bolted to and rising perpendicularly from support block 410 are a pair of slide rods 430. Slidably disposed on these rods is a support block 432. Block 432 is provided with a pair of bores 434 fitted with bushings 436 to slidably receive rods 430, and plastic caps 438 are affixed to the upper ends of rods 430 so as to serve as stops for block 432. Caps 438 are preferably affixed to rods 430 by means of screws 440 set in tapped blind holes 442, though other means may be used. Affixed to the bottom portion of member 410 is a double-acting pneumatic actuator 446. Actuator 446 is provided with hose fittings 448 and a piston rod 450 (FIG. 1) which passes through an oversized bore in member 410 (not shown) and is secured to the bottom of support block 432. Hose fittings 448 of actuator 446 are connected by a suitable four-way valve (not shown) to a source of pressurized air. The normal position of actuator 446 is with its piston rod extended. By alternately applying the pressurized air to one or the other of fittings 448, piston rod 450 may be moved upward and downward relative to support block 410, thus moving support block 432 along support rods 430.

Figure 7:
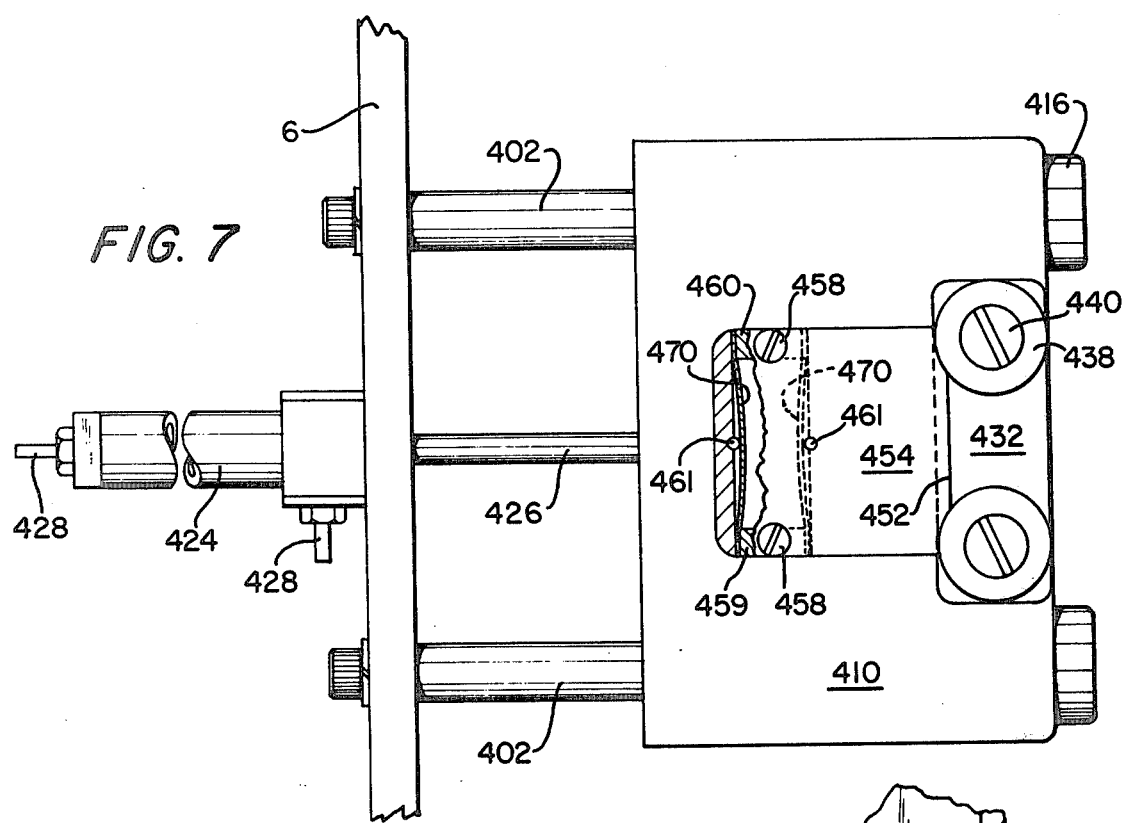
FIG. 7 is a plan view of the preferred form of the splice trimmer.

Member 432 is provided with a recessed section 452 (FIG. 2) sized so as to receive blade support 454. Blade support 454 is mounted perpendicularly to support block 432 and is held firmly in place by means of screws 456 (FIG. 1). Blade support 454 is provided with a transverse slot 457 on its underside at its free end, and disposed in the opposite ends of the slot and secured to blade support 454 by means of screws 458 are two blade retainers 459 and 460. Secured into holes in blade support 454 at opposite sides of slot 457 are two pins 461. Two blades 470 are disposed in cavity 457, with each blade having its opposite ends sandwiched between and clamped by retainers 459 and 460 and the adjacent surfaces of blade support 454. Pins 457 are located so as to engage and bow blades 470 toward each other as shown in FIG. 7.

Removal and replacement of blades 470 is accomplished by removing retainers 459 and 460. Pins 461 are permanently affixed to support 454.

Splice trimmer assembly 400 operates in the following manner. In its at-rest position, support block 410 is seated against plastic caps 416 and support block 432 is seated against plastic caps 438 as shown in FIG. 2. When trimming of a splice is to be accomplished, actuator 424 is stimulated by fluid pressure via one of the fittings 428, causing piston rod 426 to retract and move support block 410 along rods 402 towards panel 6. Then actuator 446 is activated via one of the couplings 448 to cause support block 432 to move downward along slide rods 430, thereby bringing cutting blades 470 into engagement with the spliced tape (supply and leader) seated on blocks 140 and 142 and effectively imparting a concave cut onto the spliced tape at each edge. Teflon ® pads 145 are engaged by blades 470 as they pass through the tape, thereby preventing the blades from contacting splicing blocks 140 and 142 directly and being dulled or damaged as a result. The Teflon ® pads are sufficiently soft to be penetrated by the blades, with the result that bowed grooves are formed in the pad and serve as seats for the blades on subsequent cutting operations. The trimmer assembly is then returned to its at-rest position by first stimulating actuator 446 so as to cause member 432 to again seat on caps 438 and then stimulating actuator 424 so as to cause member 410 to reseat on caps 416.

Also mounted to front panel 6 is the tape take-up assembly 500. It comprises a rotatable shaft 502 driven by a motor 504 which is mounted on the rear side of panel 6, and a hub 506 mounted on and affixed to shaft 502. Hub 506 is splined so as to accommodate and drive a tape spool or hub 508 like spool 33.

Tape packing assembly 600 comprises a single acting pneumatic actuator 602 and its hose fitting 604, a packer wheel 606 rotatably mounted on an arm 608, and a brake mechanism comprising a brake pad 609 mounted on a spring arm 610. By suitably stimulating actuator 602 via fitting 604, wheel 606 can be urged up into engagement with spool 508. Wheel 606 is sized so as to fit between the two outer rims of spool 508 and seat directly on the inside center hub section of the spool. Brake 610 is engaged by and serves to stop the movement of wheel 606 once the wheel is retracted from its contact with spool 508.

The tape winding machine described herein is intended to be operated in the following manner. First, suction is established in apertures 153 on the splicing block assembly via fitting 149. Next a reel 18 of magnetic tape 20 is loaded onto hub 16 for dispensing into smaller reels. Tape 20 is brought around idler wheel 22, through tape detector 26, around second idler wheel 24 and counter wheel 28, and along groove 154 of block 142 to gap 144 which lies between blocks 140 and 142. It is maintained in this position by means of the suction in apertures 153, with the splicing block assembly in its inner position. Actuator 181 is activated to press pad 184 down against supply tape 20.

Next the spools 33 and 508, with a leader tape connected to and extending between them, are mounted on the machine as shown. Leader tape 40 is threaded along grooves 146 and 152 and held in place by means of the suction created in apertures 153. An idler wheel 42 supported by panel 6 serves to direct the tape from groove 146 to spool 508. Once leader tape 40 is in place spool 508 or 33 is turned by hand to take up any slack which may exist in the leader line between the two spools.

This having been done, actuator 602 is stimulated via fitting 604 to bring wheel 606 of the tape packing assembly into engagement with the leader tape on spool 508. Wheel 606 is sized so that it fits within the rims of spool 508 and engages the central hub around which tape winds, thereby assisting the tape deployment on spool 508. With wheel 606 deployed, knife mechanism 200 is activated via fitting 270A so as to bring cutting blade 269 across the leader tape and thereby sever it along the line defined by gap 144. Then mechanism 200 retracts its projected blade 269, returning to its rest position.

At this point splicing block 142 is moved to its outer position, carrying the cut section of leader tape 40 held in groove 152 out of alignment with the second cut section of leader tape held in groove 146 and putting the supply tape held in groove 154 into alignment with the leader tape sections held in groove 146. Then the splicing assembly 300 is activated via couplings 379 so as to splice the aligned supply and leader tapes together, thereby effectively coupling the supply tape of reel 18 to spool 508.

Once the splice is made, trimmer assembly 400 is activated by consecutively stimulating actuators 424 and 446. This moves the trimmer from its rest position into engagement with the spliced tape, with cutting blades 470 bearing down on the splice so as to effectively trim the splice in the manner previously described. This trimming done, actuators 446 and 424 are then again consecutively stimulated so as to withdraw the trimmer assembly to its original position. Then actuator 181 is reactivated to disengage pad 184 from tape 20.

Now winding motor 504 is activated, thereby driving spool 508 and winding a desired quantity of tape 20 onto the spool. Packing wheel 606 is used to properly deploy tape 20 on spool 508. When a sufficient quantity of tape has been transferred, motor 504 is stopped, and packing wheel 606 is withdrawn from spool 508 and stopped via brake mechanism 610. The pad 184 is again brought down against the supply tape on splicing block 142 and knife mechanism 200 is again stimulated, this time to sever the supply tape along gap 144. Next splicing block 142 is returned to its original inner position, again aligning the tape in groove 146 with the leader tape in groove 152, and then splicing mechanism 300 is activated to effect a new splice.

This done, splice trimmer 400 is once again stimulated so as to impart a double concave cut to the splice, thereby effectively trimming away any tape overhang in the region of that splice. The tape trimmings produced by the splice trimmer are allowed to fall freely away.

In this manner magnetic supply tape from reel 18 is added to the leader line 40 and wound onto spool 508. Thereafter spools 508 and 33 are replaced with new spools and a connecting leader tape, and the process may be repeated over and over until supply reel 18 is depleted. When supply reel 18 is depleted, tape sensor 26 will automatically stop the tape winding machine.

The foregoing mode of operation may be accomplished automatically by means of a suitable programmer, and suitable pneumatic and electrical circuits controlled by the programmer, e.g., programmers and circuits similar to those shown in U.S. Pat. Nos. 4,061,286, 3,753,834 and 3,997,123. In lieu of an automatic programmer, the control system of the machine may comprise a plurality of manually operable switches for selectively and individually controlling operation of the various operating mechanisms.

There are numerous advantages to using the present invention. First, the splice trimmer is specifically designed to eliminate the tape overhang problems characteristic of winding machines of the type previously described. Second, the splice trimmer is able to accomplish its trimming without human interference, thereby speeding up the overall tape winding operation while eliminating significant labor costs. Third, the trimmer is designed to operate pneumatically, thereby allowing a central programmer directing operation of the machine via pneumatic devices, to coordinate the trimmer with other parts of the winder. In this way, the splice trimmer can be coordinated into the operating sequence of the machine.

Finally, it should be noted that the preferred embodiment illustrated and described herein is intended solely for the sake of example and clarity and should be in no way construed as limiting the scope of the present invention, since various alterations may be carried out on the illustrated embodiment without departing from the essential features of the invention. Thus, for example, one might operate the splice trimmer with hydraulic pressure rather than pneumatic pressure or a different means for supporting the cutter blades may be employed.

It also is possible to install a trimmer of this kind on a machine adapted to load spools already installed in cassettes, such as the one shown in U.S. Pat. No. 4,061,286.

These and other changes of their kind are considered to be obvious to one skilled in the art.

What is claimed is:

1. In a tape winding machine for splicing a selected supply tape into a leader tape connected between first and second hubs and winding said supply tape onto said first hub, said winding machine comprising: hub-holding means, a splicing block assembly for supporting the leading end of a supply tape and a leader tape, cutting means for cutting along a predetermined cutting line a supply tape or a leader tape that is supported by said splicing block assembly and extends across said predetermined cutting line, splicing means for splicing together abutting ends of the leader and supply tapes, drive means for rotating said first hub so as to wind said supply tape on to that hub, and means for operating said foregoing means whereby: (a) said leader may be severed into two sections, (b) the leader section attached to said first hub may be spliced to the leading end of said supply tape, (c) a selected length of supply tape and the one leader section may be wound onto said first hub, (d) the supply tape may be severed so as to form a trailing end for said length of supply tape on said splicing block assembly, and (e) the leader section may be spliced to the trailing end of the severed length of supply tape;

a splice trimmer assembly for removing substantially all tape overhang from a splice, said splice trimmer assembly comprising:
(1) cutting means for trimming the splice of a spliced tape on said splicing block so as to eliminate any tape overhang from the edges of said spliced tape at said splice; and
(2) transport means for supporting said cutting means and for moving said cutting means into and out of engagement with opposite edges of a spliced tape on said splicing block, said transport means comprising a first means for mounting and moving said cutting means vertically relative to said splicing block and a second means for mounting and moving said first means horizontally relative to said splicing block.

2. Apparatus according to claim 1 wherein said cutting means comprises a support block, and at least one edge cutting element carried by said support block.

3. Apparatus according to claim 1 wherein said splicing block assembly is mounted to a front panel, said first means comprises a first support block slidably disposed on at least a first support rod, and a first actuator for moving said first support block along said at least one support rod, and said second means comprises a second support block slidably disposed on at least a second support rod, and a second actuator for moving said second support block along said at least second support rod, and further wherein said first support rod is mounted to said second support block and said second rod is mounted perpendicularly to said first panel.

4. Apparatus according to claim 3 wherein said cutting means is secured to said first support block.

5. Apparatus according to claim 3 wherein said first and second actuators are adapted to be pneumatically stimulated.

6. Apparatus according to claim 1 or 4 wherein said cutting means comprises a pair of cutting blades mounted side by side.

7. Apparatus according to claim 6 wherein said cutting blades are bowed inwardly toward one another so as to impart a double concave cut to said spliced tape.

8. A method for winding a selected amount of a supply tape onto one of first and second hubs where the hubs are connected together by a leader tape, said method comprising the following steps:

positioning the leader on a splicing block assembly, severing the leader into first and second leader sections each supported by said splicing block assembly, splicing said first leader section to the leading end of a supply tape of indefinite length so as to make a first splice, trimming the edges of said first leader section and the leading end of said supply tape at said first splice, winding said first leader section and said supply tape attached thereto onto said first hub, terminating winding, severing said supply tape at a selected point so as to form a trailing end for the supply tape wound on said first hub, splicing said trailing end to the second leader section so as to make a second splice, and trimming the edges of said second leader section and the trailing end of said supply tape at said second splice, said trimming being accomplished by (a) moving a pair of cutting blades from a first position in front of said splicing block assembly to a second position over said splice, (b) moving said cutting blades from said second position to a third position in engagement with said splice so as to impart a double-concave cut to the margins of said splice, (c) moving said cutting blades from said third position to said second position, and (d) moving said cutting blades from said second position to said first position.

9. In a tape winding machine for splicing a selected supply tape on a splicing block into a leader tape connected between first and second hubs and winding said supply tape onto said first hub, a splice trimmer assembly for trimming splicing junctions, comprising: (1) two cutting blades mounted alongside one another and bowed inwardly toward one another, and (2) transport means comprising a first support block slidably disposed on a set of first support rods, a first actuator for moving said first support block along said first support rods, a second support block slidably disposed on a set of second support rods, and a second actuator for moving said second support block along said second support rods, said cutting blades being mounted to said first support block, said first support rods being mounted to the top portion of said second support block, and said second support rods being mounted to said tape winding machine in such a manner that said first actuator moves said cutting blades vertically relative to the top side of said splicing block, and said second actuator moves said cutting means horizontally relative to said splicing block.

* * * * *